(12) United States Patent
Adams et al.

(10) Patent No.: US 7,727,376 B2
(45) Date of Patent: *Jun. 1, 2010

(54) PROCESS TO PREPARE BASE OIL FROM A FISHER-TROPSCH SYNTHESIS PRODUCT

(75) Inventors: Nicholas James Adams, Petit Couronne (FR); Michiel Cramwinckel, The Hague (NL); Jan Lodewijk Maria Dierickx, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1106 days.

This patent is subject to a terminal disclaimer.

(21) Appl. No.: 10/561,945

(22) PCT Filed: Jul. 2, 2004

(86) PCT No.: PCT/EP2004/051349

§ 371 (c)(1),
(2), (4) Date: Dec. 21, 2005

(87) PCT Pub. No.: WO2005/003067

PCT Pub. Date: Jan. 13, 2005

(65) Prior Publication Data

US 2006/0157384 A1 Jul. 20, 2006

(30) Foreign Application Priority Data

Jul. 4, 2003 (EP) .................................. 03291660

(51) Int. Cl.
*C07C 5/22* (2006.01)
(52) U.S. Cl. ............................. 208/49; 208/61; 208/69; 208/107; 208/134; 585/736; 585/738
(58) Field of Classification Search ........................ None
See application file for complete search history.

(56) References Cited

U.S. PATENT DOCUMENTS

| 4,042,488 A | 8/1977 | Perciful ........................ 208/102 |
| 4,417,088 A | 11/1983 | Miller .......................... 585/533 |
| 4,434,308 A | 2/1984 | Larkin et al. ................... 585/10 |

(Continued)

FOREIGN PATENT DOCUMENTS

EP 0092376 10/1983

(Continued)

OTHER PUBLICATIONS

International Search Report dated Dec. 7, 2004 (PCT/EP2004/051349).

*Primary Examiner*—Tam M Nguyen

(57) ABSTRACT

A process to prepare base oils from a Fischer-Tropsch synthesis product by
  (a) separating the Fischer-Tropsch synthesis product into a fraction (i) boiling in the middle distillate range and below, a heavy ends fraction (iii) and an intermediate base oil precursor fraction (ii) boiling between fraction (i) and fraction (iii),
  (b) subjecting the base oil precursor fraction (ii) to a catalytic hydroisomerisation and catalytic dewaxing process to yield one or more base oil grades,
  (c) subjecting the heavy ends fraction (iii) to a conversion step to yield a fraction (iv) boiling below the heavy ends fraction (iii) and
  (d) subjecting the high boiling fraction (v) of fraction (iv) to a catalytic hydroisomerisation and catalytic dewaxing process to yield one or more base oil grades.

12 Claims, 3 Drawing Sheets

U.S. PATENT DOCUMENTS

| | | | |
|---|---|---|---|
| 4,574,043 A | 3/1986 | Chester et al. | 208/59 |
| 4,599,162 A | 7/1986 | Yen | 208/59 |
| 4,684,759 A | 8/1987 | Lam | 585/652 |
| 4,827,064 A | 5/1989 | Wu | 585/10 |
| 4,827,073 A | 5/1989 | Wu | 585/530 |
| 4,919,788 A | 4/1990 | Chen et al. | 208/59 |
| 4,943,672 A | 7/1990 | Hamner et al. | 585/737 |
| 4,990,709 A | 2/1991 | Wu | 585/10 |
| 5,059,299 A | 10/1991 | Cody et al. | 208/27 |
| 5,885,438 A | 3/1999 | Apelian et al. | 208/27 |
| 6,080,301 A | 6/2000 | Berlowitz et al. | 208/18 |
| 6,179,994 B1 | 1/2001 | Clark et al. | 208/27 |
| 6,703,535 B2 | 3/2004 | Johnson et al. | 585/303 |
| 6,706,936 B2 | 3/2004 | O'Rear | 585/330 |
| 2004/0029984 A1 | 2/2004 | Johnson | 518/726 |
| 2004/0045868 A1 * | 3/2004 | Germaine | 208/58 |

FOREIGN PATENT DOCUMENTS

| | | |
|---|---|---|
| EP | 0101553 | 2/1984 |
| EP | 0458895 | 12/1991 |
| EP | 0532118 | 3/1993 |
| EP | 0536325 | 4/1993 |
| EP | 0540590 | 5/1993 |
| EP | 0668342 | 8/1995 |
| EP | 0776959 | 6/1997 |
| EP | 0832171 | 4/1998 |
| FR | 2818285 | 6/2002 |
| WO | 97/21788 | 6/1997 |
| WO | 99/20720 | 4/1999 |
| WO | 99/34917 | 7/1999 |
| WO | 99/41332 | 8/1999 |
| WO | 00/14179 | 3/2000 |
| WO | 01/07538 | 2/2001 |
| WO | 02/070627 | 9/2002 |
| WO | 02/070629 | 9/2002 |

* cited by examiner

PROCESS TO PREPARE BASE OIL FROM A FISHER-TROPSCH SYNTHESIS PRODUCT

Priority Claim

The present application claims priority on European Patent Application 03291660.3 filed 04 Jul. 2003.

Field of the Invention

The present invention relates to a process to prepare base oils or the intermediate waxy raffinate product in a high yield from a Fischer-Tropsch synthesis product.

Such processes are known from WO-A-9941332, U.S. Pat. No. 6,080,301, EP -A-0668342, U.S. Pat. No. 6,179,994 or WO-A-02070629. These processes all comprise some kind of hydroisomerisation of the Fischer-Tropsch synthesis product followed by a dewaxing step of the higher boiling fraction obtained in said hydroisomerisation.

WO-A-02070629, for example, describes a process wherein the C5 plus fraction of a Fischer-Tropsch synthesis product is first subjected to a hydrocracking/hydroisomerizing step in the presence of a catalyst consisting of platinum on an amorphous silica-alumina carrier. The effluent of this conversion step is separated into middle distillate products and a base oil precursor fraction and a higher boiling fraction. The base oil precursor fraction is catalytically dewaxed in the presence of a platinum-ZSM-5 based catalyst and the heavy fraction is recycled to the hydrocracking/hydroisomerizing step.

Although such a process will yield excellent quality base oils there is room for improvement. Especially the yield of base oils relative to the Fischer-Tropsch synthesis product may be improved. Especially for base oils having a kinematic viscosity at 100° C. of between 2 and 8 cSt an improved yield would be welcome.

The invention provides a process to prepare base oils from a Fischer-Tropsch synthesis product by (a) separating the Fischer-Tropsch synthesis product into a fraction (i) boiling in the middle distillate range and below, a heavy ends fraction (iii) and an intermediate base oil precursor fraction (ii) boiling between fraction (i) and fraction (iii), (b) subjecting the base oil precursor fraction (ii) to a catalytic hydroisomerisation and catalytic dewaxing process to yield one or more base oil grades, (c) subjecting the heavy ends fraction (iii) to a conversion step to yield a fraction (iv) boiling below the heavy ends fraction (iii) and (d) subjecting the high boiling fraction (v) of fraction (iv) to a catalytic hydroisomerisation and catalytic dewaxing process to yield one or more base oil grades.

BRIEF DESCRIPTION OF THE DRAWINGS

The invention will also be illustrated by making use of FIGS. 1-4.

Figure 1:
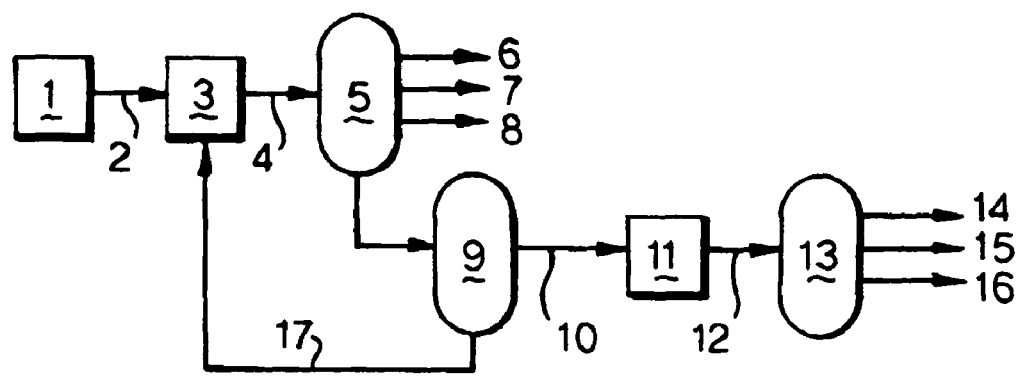
FIG. 1 illustrates a state of the art process of WO-A-02070629.

Applicants have found that by directly subjecting the fraction of the intermediate fraction (ii) of the Fischer-Tropsch synthesis product and the high boiling fraction (v) as obtained in step (c) to a selective isomerisation and dewaxing step a higher yield to base oils relative to the Fischer-Tropsch synthesis product may be obtained.

Without intending to be bound by the following theory it is believed that the high yield to base oils is achieved in that the fraction boiling in the base oil range, i.e. fractions (ii) and (v), are directly contacted with the isomerisation and dewaxing catalysts. In the prior art process of WO-A-02070629 the corresponding fraction of the Fischer-Tropsch synthesis product was first contacted with a catalyst which would convert a large part to middle distillate products and lower boiling products. By using this different line-up the conversion of potential base oil molecules in the Fischer-Tropsch synthesis product to middle distillate molecules is minimized. Furthermore in the process of WO-A-02070629 the heavy fraction as obtained in the hydrocracking/hydroisomerizing step is recycled to said step. This results in that more potential base oil molecules are converted to middle distillate molecules.

The Fischer-Tropsch synthesis product can be obtained by well-known processes, for example the so-called commercial Sasol process, the Shell Middle Distillate Process or by the non-commercial Exxon process. These and other processes are for example described in more detail in EP-A-776959, EP-A-668342, U.S. Pat. No. 4,943,672, U.S. Pat. No. 5,059, 299, WO-A-9934917 and WO-A-9920720. Typically these Fischer-Tropsch synthesis products will comprise hydrocarbons having 1 to 100 and even more than 100 carbon atoms. The hydrocarbon product will comprise iso-paraffins, n-paraffins, oxygenated products and unsaturated products. The feed to step (a) or any fractions obtained in step (a) may be hydrogenated in order to remove any oxygenates or unsaturated products. The process of the present invention is especially advantageous when a substantial part, preferably more than 10 wt %, more preferably more than 30 wt % and even more preferably more than 50 wt % of the Fischer-Tropsch synthesis product boils above 550° C. An example of a suitable process which may prepare such a heavy Fischer-Tropsch synthesis product is described in WO-A-9934917and in AU-A-698392.

In step (a) the Fischer-Tropsch synthesis product is separated into a fraction (i) boiling in the middle distillate range and below, a heavy ends fraction (iii) preferably, having an initial boiling point between 500 and 600° C. and an intermediate base oil precursor fraction (ii) boiling between fraction (i) and fraction (iii). Suitably the Fischer-Tropsch synthesis product is first fractionated at atmospheric pressure or higher to obtain fraction (i) boiling in the middle distillate range and below. Fractionation may be performed by flashing or distillation. The middle distillate range is sometimes defined as the fraction boiling predominately, i.e. for more than 90 wt %, between 200 and 350° C. and it comprises the gas oil and kerosene fractions, which can be isolated from the Fischer-Tropsch synthesis product. The residue or bottom product of the atmospheric fractionation is further separated at near vacuum pressure to the heavy ends fraction (iii) having an initial boiling point between 500 and 600° C. and the intermediate base oil precursor fraction (ii). More preferably the $T_{10\ wt\ \%}$ recovery point of the heavy ends fraction (iii) is between 500 and 600° C.

In step (b) the base oil precursor fraction (ii) is subjected to a catalytic hydroisomerisation and catalytic dewaxing process to yield one or more base oil grades. These catalytic processes are defined according to this invention as processes which are selective for reducing the pour point of this fraction while minimising the conversion of molecules boiling above 370° C. to molecules boiling below 370° C. It should be noted that when lower temperature pour points are desired for the base oil, more molecules will, even by the more selective isomerisation and dewaxing processes, be converted to fractions boiling below 370° C. Selective isomerisation and dewaxing processes are preferably processes wherein less than 40 wt %, more preferably less than 30 wt %, of the feed to step (b) is converted to a fraction boiling below 370° C. when preparing a base oil having a kinematic viscosity at 100° C. of 5 cSt and having a pour point of −27° C. and a Noack volatility of 10 wt %. Examples of processes having the above described selectivity to base oils are well known and will be described below.

In step (b) the catalytic hydroisomerisation and catalytic dewaxing may be performed by one catalyst or by separate dedicated isomerisation and dewaxing catalysts.

Examples of possible isomerisation catalysts comprise one or more Group VIII metal, for example nickel, cobalt platinum or palladium on a refractory oxide carrier. Examples of specific catalysts are Pt on silica-alumina carrier (ASA), Pd on ASA, PtNi on ASA, PtCo on ASA, PtPd on ASA, CoMoCu on ASA, NiMoCu on ASA, NiW on ASA, NiWF on alumina, PtF on ASA, NiMoF on alumina. As a separate dewaxing step use may be made in step (b) of the well known catalytic dewaxing processes wherein catalysts are used comprising medium pore size molecular sieves and a hydrogenation component, preferably a noble metal such as platinum or palladium. Examples of such processes are those based on SAPO-11 as described in for example EP-A-458895, ZSM-5 as for example described in EP-B-832171, ZSM-23 as described in for example EP-A-540590 and EP-A-092376, ZSM-22 as for example described in U.S. Pat. No. 4,574,043, mordenite as for example described in U.S. Pat. No. 6,179,994 and ferrierite as for example described in EP-A-1029029.

Such separate isomerisation processes in combination with a catalytic dewaxing process is for example described in EP-A-776959.

If step (b) is carried out using a single catalyst process, catalyst may be used based on for example catalysts comprising platinum-zeolite-beta, as described in for example U.S. Pat. No. 5,885,438, or ZSM-23 or ZSM-22 based catalysts as for example described in EP-A-536325. Preferably use is made of a process which makes use of a ZSM-12 based catalyst as for example described in WO-A-0107538.

Advantageously an isomerisation step using a catalyst based on zeolite-beta is combined with a selective catalytic dewaxing step wherein use can be made of the dewaxing catalysts described above. Examples of the use of platinum-zeolite-beta catalysed step followed by a more selective dewaxing step using a platinum-ZSM-23 catalysed step is for example in U.S. Pat. No. 4,919,788 and EP-A-1,029,029. The ZSM-23, ZSM-22 and ZSM-12 catalysts may also be used in a cascade dewaxing operation wherein the final dewaxing is performed making use of a more restricted pore size zeolite like for example ZSM-5, ZSM-11 or ferrierite as for example described in U.S. Pat. No. 4,599,162.

A most preferred process for step (b) comprises contacting the fraction (ii) with a catalyst comprising ZSM-12, platinum and a binder. It has been found that this process achieves a high selectivity to base oils. Another advantage is less gaseous by-products and more gas oil by-products are made. Preferably the binder is a low acidity binder comprising essentially no alumina. Preferably the binder is silica. More preferably the zeolite is dealuminated and more preferably a dealumination treatment is chosen which claims to selectively dealuminate the surface of the ZSM-12 crystallites. Such catalysts and the process conditions for performing this process are described in more detail in WO-A-0107538.

After performing a dewaxing step (b) the desired base oil(s) are preferably isolated from the dewaxed effluent in a base oil recovery step (e). In this step (e) lower boiling compounds formed during catalytic dewaxing are removed, preferably by means of distillation, optionally in combination with an initial flashing step. By choosing a suitable distillation cut as feed to step (b) in step (a) it is possible to obtain a single desired base oil directly after a catalytic dewaxing step (b) without having to remove any higher boiling compounds from the end base oil grade. Examples of very suitable grades are base oils having a kinematic viscosity at 100° C. of between 3.5 and 6 cSt.

It has also been found possible to make more than one viscosity grade base oil with the process according to the invention. By obtaining a base oil precursor fraction (ii) in step (a) having a more broad boiling range more base oil grades may advantageously be obtained in step (e). Preferably the difference between the $T_{10}$ wt % recovery point and the $T_{90}$ wt % recovery point in the boiling curve is larger than 100° C. In this mode the effluent of step (b) is separated into various distillate fractions comprising two or more base oil grades. In order to meet the desired viscosity grades and volatility requirements of the various base oil grades preferably off-spec fractions boiling between, above and/ or below the desired base oil grades are also obtained as separate fractions. These fractions and any fractions boiling in the gas oil range or below may advantageously be recycled to step (a). Alternatively fractions obtained boiling in the gas oil range or below may suitably be used as a separate blending component to prepare a gas oil fuel composition.

The separation into the various fractions in step (e) may suitably be performed in a vacuum distillation column provided with side strippers to separate the fraction from said column. In this mode it is found possible to obtain for example a 2-3 cSt product, a 4-6 cSt product and a 7-10 cSt product simultaneously from a single base oil precursor fraction (ii). The viscosity values are the kinematic viscosity at 100° C.

In step (c) the heavy ends fraction (iii) is subjected to a conversion step to yield a fraction (iv) boiling below the heavy ends fraction (iii). Step (c) may be performed by any conversion process capable of converting the heavy Fischer-Tropsch wax to lower boiling hydrocarbon compounds. If the conversion product of step (c) is to contain a high content of olefinic compounds preferably a conversion process is applied which operates in the absence of added hydrogen. Examples of suitable processes which operate in the absence of added hydrogen are the well known thermal cracking process as for example described in U.S. Pat. No. 6,703,535 and the catalytic cracking process as for example described in U.S. Pat. No. 4,684,759. If on the other hand the conversion product of step (c) is to contain almost no olefins preferably a process is applied which is performed in the presence of added hydrogen. An example of a suitable process is the well known hydroisomerisation/hydrocracking process.

Preferably a hydrocracking/hydroisomerisation reaction takes place in step (c). Step (c) is preferably performed in the presence of hydrogen and a catalyst, which catalyst can be chosen from those known to one skilled in the art as being suitable for this reaction. Examples of such catalysts are the isomerisation catalysts as described above when discussing step (b). Catalysts for use in step (c) typically are amorphous catalysts comprising an acidic functionality and a hydrogenation/dehydrogenation functionality. Preferred acidic functionalities are refractory metal oxide carriers. Suitable carrier materials include silica, alumina, silica-alumina, zirconia, titania and mixtures thereof. Preferred carrier materials for inclusion in the catalyst for use in the process of this invention are silica, alumina and silica-alumina. A particularly preferred catalyst comprises platinum, platinum or platinum and palladium supported on a silica-alumina carrier. If desired, the acidity of the catalyst carrier may be enhanced by applying a halogen moiety, in particular fluorine or chlorine, or a phosphorous moiety to the carrier. Examples of suitable hydrocracking/hydroisomerisation processes and suitable catalysts are described in WO-A-200014179, EP-A-532118 and the earlier referred to EP-A-776959.

Preferred hydrogenation/dehydrogenation functionalities are Group VIII non-noble metals, for example nickel and more preferably Group VIII noble metals, for example palladium and most preferably platinum or platinum and palladium. The catalyst may comprise the hydrogenation/dehydrogenation active component in an amount of from 0.005 to 5 parts by weight, preferably from 0.02 to 2 parts by weight, per 100 parts' by weight of carrier material. A particularly preferred catalyst for use in the hydroconversion stage comprises platinum in an amount in the range of from 0.05 to 2 parts by weight, more preferably from 0.1 to 1 parts by weight, per 100 parts by weight of carrier material The catalyst may also comprise a binder to enhance the strength of the catalyst. The binder may be non-acidic. Examples are alumina, silica, clays and other binders known to one skilled in the art.

In step (c) the feed is contacted with hydrogen in the presence of the catalyst at elevated temperature and pressure. The temperatures typically will be in the range of from 175 to 380° C., preferably higher than 250° C. and more preferably from 300 to 370° C. The pressure will typically be in the range of from 10 to 250 bar and preferably between 20 and 80 bar. Hydrogen may be supplied at a gas hourly space velocity of from 100 to 10000 Nl/l/hr, preferably from 500 to 5000 Nl/l/hr. The hydrocarbon feed may be provided at a weight hourly space velocity of from 0.1 to 5 kg/l/hr, preferably higher than 0.5 kg/l/hr and more preferably lower than 2 kg/l/hr. The ratio of hydrogen to hydrocarbon feed may range from 100 to 5000 Nl/kg and is preferably from 250 to 2500 Nl/kg.

The conversion in step (c) as defined as the weight percentage of the feed boiling above 370° C. which reacts per pass to a fraction boiling below 370° C. is preferably at least 20 wt %, more preferably at least 25 wt %, preferably not more than 80 wt %, more preferably not more than 70 wt % and even more preferably not more than 65 wt %.

Step (c) may also be performed making use of a catalyst comprising a molecular sieve and a metal hydrogenation component. Examples of suitable molecular sieves are SAPO-11, ZSM-22 or ZSM-23. Preferably the molecular sieve has a pore structure of the 12-oxygen ring type. Suitable molecular sieves having a 12-member ring structure for use in the present invention are zeolite beta and ZSM-12. Suitable hydrogenation metals are preferably of Group VIII of the periodic table of elements. More preferably the hydrogenation component is nickel, cobalt and even more preferably platinum or palladium. Examples of the above catalysts are described in more detail above at step (b). An advantage of using a molecular sieve based type catalyst in step (c) is that an additional dewaxing of the resultant base oil may be omitted. In essence step (c) and step (d) are thus combined in one step. It has been found that very high viscosity base oil grades, preferably having a kinematic viscosity at 100° C. of above 15 cSt, may be prepared in this manner. The maximum viscosity will depend on the heaviness of the Fischer-Tropsch synthesis product used as feed in step (a).

Preferably the effluent of the above combined steps (c) and (d) is provided to the same above described base oil work up section (step (e)). This is advantageous because the isolation of all base oil grades, including the heavier grade, may then be performed in the same distillation column(s).

In the event step (c) is performed in the presence of a molecular sieve based catalyst the following process conditions are generally applied. The temperatures typically will be in the range of from 175 to 380° C., preferably higher than 200° C. and more preferably from 220 to 330° C. The required temperature will partly depend on the acidity of the molecular sieve which may vary per type of molecular sieve and the degree of dealumination. A skilled person can easily find the optimal temperature conditions. The pressure will typically be in the range of from 10 to 250 bar and preferably between 20 and 80 bar. Hydrogen may be supplied at a gas hourly space velocity of from 100 to 10000 Nl/l/hr, preferably from 500 to 5000 Nl/l/hr. The hydrocarbon feed may be provided at a weight hourly space velocity of from 0.1 to 5 kg/l/hr, preferably higher than 0.5 kg/l/hr and more preferably lower than 2 kg/l/hr. The ratio of hydrogen to hydrocarbon feed may range from 100 to 5000 Nl/kg and is preferably from 250 to 2500 Nl/kg.

If step (c) is performed by means of a thermal cracking of catalytic cracking process the effluent will contain relatively high contents of olefinic compounds boiling below 370° C. and especially in the fraction boiling in the gasoline range of between 25 and 215° C. These fractions are obtained as the remaining lower boiling fraction (vi) when isolating by distillation the high boiling fraction (v) from fraction (iv). The olefin content in these fractions may range up to and above 50 wt %. These olefins include propylene which can be used as a chemical feedstock, $C_4$-olefins which can be used as alkylation feedstock and $C_5$ and higher olefins which can be used as feed to an oligomerisation step to increase the yield to higher boiling products such as gas oil and base oils. These olefins are advantageous if one intends to prepare a gasoline blending fraction or as feedstock to an alkylation process step (g) to prepare gasoline blending compounds from $C_4$-olefins and $C_4$-paraffins present in such fractions or as feedstock for an additional oligomerisation step (f) to prepare compounds boiling in the gas oil and base oil boiling range.

The suitable thermal cracking step employed in step (c) is intended to crack the paraffin molecules into lower molecular weight olefins. The process may be performed in the liquid or vapor phase. Examples of liquid phase process configurations are the batch pyrolysis reactors such as employed in delayed coking or in cyclic batch operations. The process may also be carried out in the gas phase wherein a continuous flow-through operation is preferred. In such a process the feed is first preheated to a temperature sufficient to vaporize most or all of the feed after which the vapor is passed through a tube or tubes. A desirable option is to bleed any remaining nonvaporized hydrocarbons prior to entering the tubes in the cracking furnace. Preferably, the thermal cracking is conducted in the presence of steam, which serves as a heat source and also helps suppress coking in the reactor. Details of a typical steam thermal cracking process may be found in U.S. Pat. No. 4,042,488.

In performing the gas phase thermal cracking operation it is preferable that the feed be maintained in the vapor phase during the cracking operation to maximize the production of olefins. In the pyrolysis zone, the cracking conditions should be sufficient to provide a cracking conversion of greater than 30% by weight of the paraffins present. Preferably, the cracking conversion will be at least 50% by weight and most preferably at least 70% by weight. The optimal temperature and other conditions in the pyrolysis zone for the cracking operation will vary somewhat depending on the feed. In general, the temperature must be high enough to maintain the feed in the vapor phase but not so high that the feed is overcracked. The temperature in the pyrolysis zone normally will be maintained at a temperature of between 500° C. and 900° C. The optimal temperature range for the pyrolysis zone in order to maximize the production of olefins from the Fischer-Tropsch wax will depend upon the endpoint of the feed. In general, the higher the carbon number, the higher the temperature required to achieve maximum conversion. The pyrolysis zone usually will employ pressures maintained between about 0 atmospheres and about 5 atmospheres, with pressures in the range of from about 0 to about 3 generally being preferred. Although the optimal residence time of the wax fraction in the reactor will vary depending on the temperature and pressure in the pyrolysis zone, typical residence times are generally in the range of from about 0.1 seconds to about 500 seconds, with the preferred range being between about 0.1 and 5 seconds.

In the event step (c) is performed using a catalytic cracking process, of which the fluid catalytic cracking (FCC) process is an example, the following conditions are preferred. Preferably the feed will be contacted with a catalyst at a temperature between 450 and 650° C. More preferably the temperature is above 475° C. The temperature of preferably below 600° C. to avoid excessive overcracking to gaseous compounds. The process may be performed in various types of reactors. Because the coke make is relatively small as compared to a FCC process operating on a petroleum derived feed it is possible to conduct the process in a fixed bed reactor. In order to be able to regenerate the catalyst more simply, preference is nevertheless given to either a fluidized bed reactor or a riser reactor. If the process is performed in a riser reactor the preferred contact time is between 1 and 10 seconds and more preferred between 2 and 7 seconds. The catalyst to oil ratio is preferably between 2 and 20 kg/kg. It has been found that good results may be obtained at low catalyst to oil ratios of below 15 and even below 10 kg/kg.

The catalyst system used in the catalytic cracking process in step (c) will at least comprise a catalyst comprising a matrix and a large pore molecular sieve. Examples of suitable large pore molecular sieves are of the faujasite (FAU) type as for example Zeolite Y, Ultra Stable Zeolite Y and Zeolite X. The matrix is preferably an acidic matrix. Examples of suitable catalysts are the commercially available FCC catalysts. The catalyst system of the process may advantageously also comprise a medium pore size molecular sieve such as to also obtain a high yield of propylene next to the gasoline fraction. Preferred medium pore size molecular sieves are zeolite beta, Erionite, Ferrierite, ZSM-5, ZSM-11, ZSM-12, ZSM-22, ZSM-23 or ZSM-57. The weight fraction of medium pore crystals on the total of molecular sieves present in this process is preferably between 2 and 20 wt %.

In step (d) the high boiling fraction (v) of fraction (iv) is subjected to a catalytic hydroisomerisation and catalytic dewaxing process to yield one or more base oil grades. The high boiling fraction (v) in the effluent of step (c) preferably has a initial boiling point of between 340 and 400° C. More preferably the 10 wt % recovery point is between 340 and 400° C. The final boiling point of said fraction (v) is preferably between 500 and 600° C. More preferably the 90 wt % recovery point is between 500 and 600° C. Step (d) may be performed as described above for step (b). Separations are preferably performed by means of distillation. Preferably the base oils are isolated from the effluent of step (d) in the same base oil work-up section (step (e)) as described above.

Preferably the effluent of step (c) is provided to step (a). This is advantageous because it reduces the number of distillation columns. In step (a) a mixture of fresh Fischer-Tropsch synthesis product and step (c) effluent will be separated simultaneously into again a fraction (i) boiling in the middle distillate range and below, a heavy ends fraction (iii) and an intermediate base oil precursor fraction (ii) boiling between fraction (i) and fraction (iii). In this embodiment step (b) and (d) are performed in the same reactor, which is also advantageous for obvious reasons.

The Fischer-Tropsch synthesis product may contain olefins and oxygenates which may be detrimental for the hydroconversion catalysts used in step (b), (c) and (d). These compounds may be removed by means of hydrogenation of the Fischer-Tropsch synthesis product prior to performing step (a) or hydrogenation of the feeds to the separate steps (b), (c) and/or (d). The latter is advantageous because some of the oxygenates present in the Fischer-Tropsch synthesis product will end up in the middle distillate fraction (i) and could serve as lubricity enhancers in the resulting gas oil or kerosene fractions. The advantages of the presence of such compounds are for example described in EP-A-101553.

Possible hydrogenation processes are for example described in EP-B-668342. The mildness of the hydrotreating step is preferably expressed in that the degree of conversion in this step is less than 20 wt % and more preferably less than 10 wt %. The conversion is here defined as the weight percentage of the feed boiling above 370° C., which reacts to a fraction boiling below 370° C. Examples of possible hydrogenation processes involve the use of nickel containing catalysts, for example nickel on alumina, nickel on silica-alumina nickel on Kieselguhr, copper nickel on alumina, cobalt on silica-alumina or platinum nickel on alumina. The hydrogenation conditions are typical conditions for these type of processes, well known to the skilled person.

The above referred to oligomerisation step (f) is intended to maximize the yield of base oils by oligomerizing the olefins present in the fraction boiling below 370° C. and especially boiling in the gasoline range as obtained in step (c). In a preferred embodiment the olefinic effluent of step (c) is provided to step (a) to obtain an olefinic fraction (i) which can be directly used in step (f) or may be further fractionated before being used in step (f). In such a scheme the feed to step (f) will also comprise the lower boiling compounds as present in the Fischer-Tropsch synthesis product. Because such a product may also contain olefins oligomerization of these olefins will then also take place in step (f). During oligomerization the lighter olefins are converted into heavier products. The molecules boiling in the base oil range as obtained in step (f) will have an excellent viscosity index making them suitable to be blended with the base oil products as obtained in steps (b) and (d). In the event the pour point is too high, the oligomerization product may be sent to a catalytic dewaxing step. In a preferred embodiment this dewaxing can be performed by co-feeding this fraction with the feed of step (b) or alternatively of step (d) to their respective dewaxing processes. Even more preferred is to send the oligomerization product to step (a) in order to simplify the number of distillation steps before performing the dewaxing in step (b). In order to avoid a build up of paraffins boiling in the same boiling range as the olefins which are converted a bleed stream is preferably present. In a preferred embodiment step (f) is performed in a catalytic distillation in which simultaneously the olefins are converted to base oil molecules, which due to their higher boiling point are recovered at the bottom of the distillation column. Unreacted olefins may be obtained at or near the top of the column and may be recycled to the catalytic distillation column.

The oligomerization of olefins has been well reported in the literature, and a number of processes are available. See, for example, U.S. Pat. No. 6,706,936, U.S. Pat. No.

20040029984, U.S. Pat. No. 6,703,535, U.S. Pat. No. 4,417,088, U.S. Pat. No. 4,434,308, U.S. Pat. No. 4,827,064, U.S. Pat. No. 4,827,073 and U.S. Pat. No. 4,990,709. Various types of reactor configurations may be employed, with the fixed catalyst bed reactor being used commercially. More recently, performing the oligomerization in an ionic liquids media has been proposed, since the contact between the catalyst and the reactants is efficient and the separation of the catalyst from the oligomerization products is facilitated. But the catalytic distillation process may also be used advantageously.

Preferably, the oligomerized product will have an average molecular weight at least 10 percent higher than the initial feedstock, more preferably at least 20 percent higher. The oligomerization reaction will proceed over a wide range of conditions. Typical temperatures for carrying out the reaction are between 0° C. and 430° C. Other conditions include a space velocity from 0.1 to 3 LHSV and a pressure from 0 to 2000 psig. Catalysts for the oligomerization reaction can be virtually any acidic material, such as, for example, zeolites, clays, resins, BF3 complexes, HF, $H_2SO_4$, $AlCl_3$, ionic liquids (preferably ionic liquids containing a Bronsted or Lewis acidic component or a combination of Bronsted and Lewis acid components), transition metal-based catalysts (such as $Cr/SiO_2$), superacids, and the like. In addition, non-acidic oligomerization catalysts including certain organometallic or transition metal oligomerization catalysts may be used, such as, for example, zirconocenes. For illustration purposes reference is made to U.S. Pat. No. 6,703,535 which publication illustrates the preparation of a base oil from an olefinic Fischer-Tropsch derived feed by means of oligomerisation.

The invention is also directed to a process to prepare the intermediate fraction (ii). This fraction may be referred to as a waxy raffinate fraction boiling preferably for more than 90 wt % between 350 and 550° C., preferably between 370 and 550° C. The process to prepare this intermediate product is preferably performed starting from a Fischer-Tropsch synthesis product which boils for more than 40 wt % and more preferably more than 50 wt % above 550° C. The process involves the following steps:

(aa) separating the Fischer-Tropsch synthesis product into a fraction (i) boiling in the middle distillate range and below, a heavy ends fraction (iii) having an initial boiling point between 500 and 600° C. and a waxy raffinate fraction (ii) boiling between fraction (i) and heavy ends fraction (iii), (bb) subjecting the heavy ends fraction (iii) to a conversion step wherein part of the heavy ends fraction is converted to lower boiling compounds and recycling the effluent of the conversion step to step (aa).

The prefered boiling range values for the fractions (i-iii) referred to here above also apply for this process embodiment.

The conversion step (bb) may be the above referred to hydroconversion steps as described for step (c) above. Alternatively thermal cracking may also be applied to convert the heavy ends. Preferably the products of the thermal cracker step (b) are hydrogenated such to at least hydrogenate the di-olefins which could be present in said product.

The waxy raffinate may be sold as a separate product. For example it may be prepared at a gas producing location and further processed to end products like for example base oils at a location closer to the end consumers. The raffinate itself may find use as feedstock to prepare base oils as described above. The waxy raffinate product may also advantageously be used as steam cracker feedstock to prepare lower olefins, for example ethylene and propylene. Because of its high paraffin content, high yields to lower olefins are possible when using such a feedstock as steam cracker feedstock.

Preferably the above process involving a thermal cracking step for step (bb) is used as a feed preparation process for a steam cracker located just down stream of said process. A possible steam cracker process could be designed to run on a combination of said waxy raffinate product and on the lower boiling fractions (i), boiling in the ethane, LPG and naphtha range and up to the gas oil range, as obtained in step (aa) in dedicated steam cracker furnaces.

FIG. 1 describes a state of the art process line-up according to WO-A-02070629 illustrating a Fischer-Tropsch synthesis process step 1 wherein a Fischer-Tropsch product 2 is prepared. This product 2 is fed to a hydrocracking/hydroisomerisation step 3. Product 4 is subsequently separated in an atmospheric distillation column 5 into a naphtha product 6, a kerosene product 7, a gas oil product 8 and a bottoms product. The bottoms product is subsequently separated in a vacuum distillation column 9 into a base oil precursor fraction 10 and a higher boiling fraction 17. The fraction 10 is subsequently catalytically dewaxed 11 and the dewaxed oil 12 is fractionated in column 13 into various base oil products 14, 15 and 16. The higher boiling fraction 17 is recycled to hydrocracking/hydroisomerisation step 3.

Figure 2:
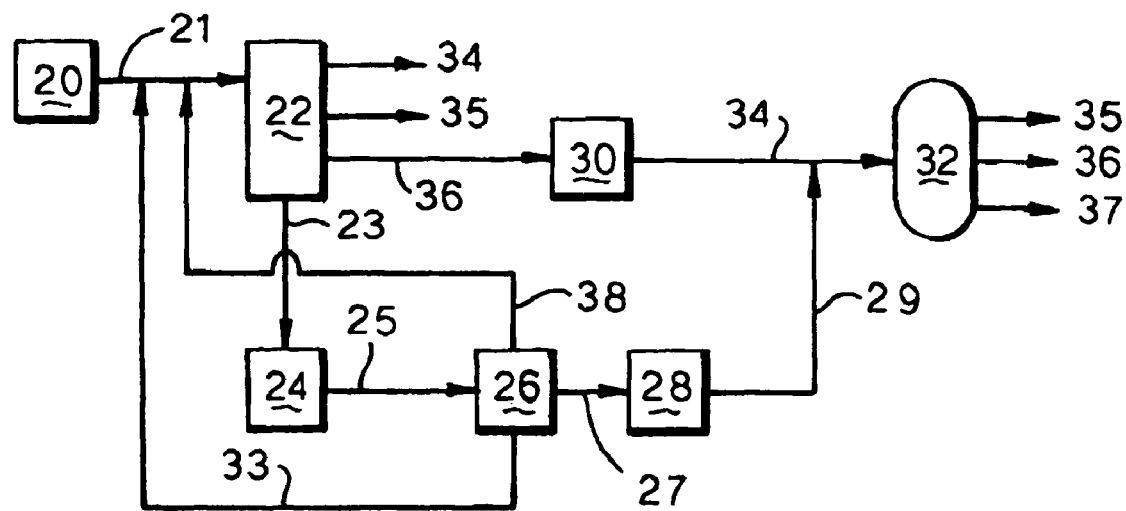
FIG. 2 illustrates a process according to the invention.

FIG. 2 illustrates an embodiment of the present invention. In a Fischer-Tropsch synthesis process step 20 a Fischer-Tropsch product 21 is prepared. This product 21 is separated by means of distillation 22 in one or more middle distillate fractions 34, 35, which may be naphtha, kerosene and gas oil, into a base oil precursor fraction 36 and a higher boiling fraction 23.

Distillation 22 may be a atmospheric distillation and a vacuum distillation scheme as in FIG. 1. The base oil precursor fraction is fed to a catalytic dewaxing step 30 and the dewaxed oil 34 is fractionated in column 32 into one or more base oil products 35, 36 and 37. The higher boiling fraction 23 is fed to a hydrocracking/hydroisomerisation step 24 yielding a cracked product 25. From this product 25 a fraction boiling in the gas oil range and below 38, a base oil precursor fraction 27 and a higher boiling fraction 33 is separated in column 26. The base oil-precursor fraction 27 is catalytically dewaxed 28 and the dewaxed oil is combined with dewaxed oil 34 to be separated in 32 as described above.

Figure 3:
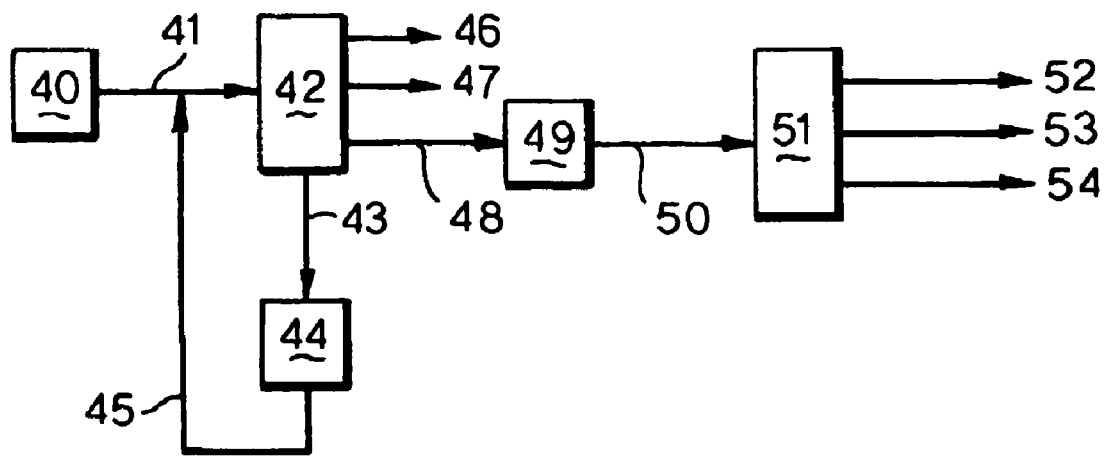
FIG. 3 illustrates a process according to the invention.

FIG. 3 is a process as in FIG. 2 wherein the products obtained in the hydrocracking/hydroisomerisation step 44 are recycled to the first separation unit 42. As can be seen by comparing FIG. 2 with FIG. 3 a considerable reduction in unit operations is achieved. In a Fischer-Tropsch synthesis process step 40 a Fischer-Tropsch product 41 is prepared. This product 41 is separated by means of distillation 42 in one or more middle distillate fractions 46, 47, which may be naphtha, kerosene and gas oil, into a base oil precursor fraction 48 and a higher boiling fraction 43. Distillation 42 may be a atmospheric distillation and a vacuum distillation scheme as in FIG. 1. The higher boiling fraction 43 is fed to a hydrocracking/hydroisomerisation step 44 yielding a cracked product 45, which is recycled to distillation 42.

The base oil precursor fraction 48 is fed to a catalytic dewaxing step 49 and the dewaxed oil 50 is fractionated in column 51 into one or more base oil products 53 and 54.

The gas oil product 52 as separated from the dewaxed oil is preferably blended with the gas oil fraction 47 such to obtain a blended product having favorable low temperature properties. The gas oil product 52 will have a low cloud point and cold filter plugging point (CFFP). The volume of the gas oil product 52 having the favorable low temperature properties may be controlled by adjusting the initial boiling point of the base oil precursor fraction 48. Such a control allows the operator to target the low volume of gas oil 52 and thus also the temperature properties, such as cloud point and CFFP of the resulting blend of gas oil products 52 and 47.

Figure 4:
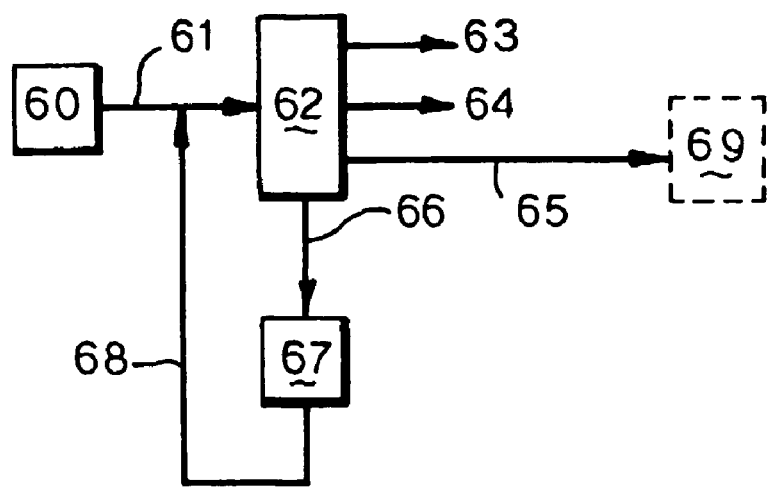
FIG. 4 illustrates a process according to the invention.

FIG. 4 illustrates a process to prepare a waxy raffinate product 65. FIG. 4 shows a Fischer-Tropsch synthesis process step 60 a Fischer-Tropsch product 61 is prepared. This product 61 is separated by means of distillation 62 in one or more middle distillate fractions 63, 64, which may be naphtha, kerosene and gas oil, into a waxy Raffinate product 65 and a higher boiling fraction 66. Distillation 62 may be an atmospheric distillation and a vacuum distillation scheme as in FIG. 1. The higher boiling fraction 66 is fed to a heavy ends conversion step 67 yielding a product 68 containing on average lower boiling molecules than the feed 66. The heavy ends conversion step 67 may be any of the steps described above for step (c). The product 68 is recycled to distillation 62. Optionally the waxy Raffinate 65 may be used as feed for a steam cracker furnace dedicated for such a feed. In a possible embodiment also a naphtha fraction 63 is fed to a dedicated steam cracker furnace. The gas oil product 64 may be advantageously sold as a separate product. Because of its high Cetane Number it may be used, more advantageously as an automotive gas oil fuel component than as a steam cracker feed stock.

Figure 5:
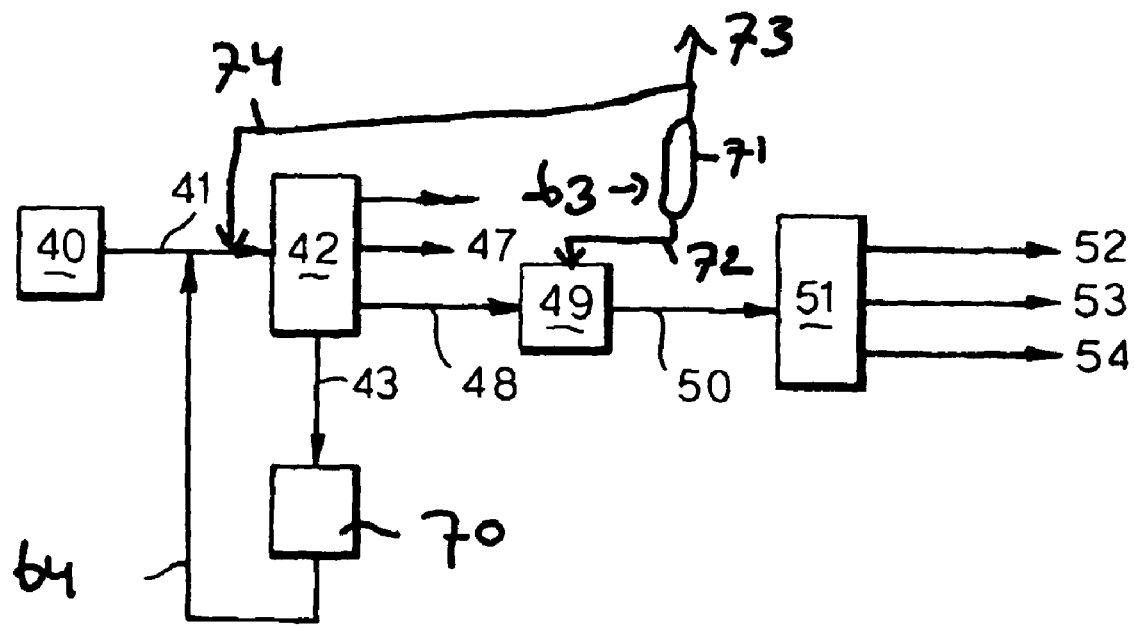
FIG. 5 illustrates a process according to the invention.

FIG. 5 is as FIG. 3 except that for step (c) a fluid catalytic cracking process (70) is performed. Fraction (64) is now rich in olefins and therefore also gasoline fraction (63) which is used as feed to a catalytic oligomerisation-distillation column (71) is rich in olefins. The bottom stream (72) rich in compounds boiling in the base oil range is sent to dewaxing step (49) to remove possible waxy compounds formed in column (71). The light compounds (74) are recycled to oligomerisation step (71) and a bleed stream (73) is present to avoid a build up of paraffins. Gas oil (47) may find application as ethylene cracker feedstock industrial gas oil or as automotive gas oil.

The invention will be illustrated by the following non-limiting examples.

EXAMPLE 1

A Fischer-Tropsch derived product having the properties as listed in Table 1 was distilled into fraction boiling substantially above 540° C. (recovered 72 wt % on feed to distillation) and a fraction boiling substantially between 350 and 540° C. (recovered as 25 wt % on feed to distillation). In addition 3 wt % of a fraction boiling substantially below 350° C. was separated from the feed. The boiling curve data of the feed and the main distillate fractions are listed in Table 1.

TABLE 1

| Sample | Fischer-Tropsch derived product (feed) | 350° C.-540° C. fraction | 540° C. + fraction |
|---|---|---|---|
| | (% weight fraction boiling below listed boiling point) (% weight) | | |
| 320° C. | 5.5 | 5.8 | 1.6 |
| 350° C. | 7.6 | 13.0 | 1.6 |
| 370° C. | 9.3 | 22.2 | 1.6 |
| 400° C. | 12.2 | 34.4 | 1.6 |
| 450° C. | 17.4 | 64.3 | 1.6 |
| 500° C. | 23.9 | 91.1 | 2.2 |
| 540° C. | 29.5 | 99.0 | 6.6 |

TABLE 1-continued

| Sample | Fischer-Tropsch derived product (feed) | 350° C.-540° C. fraction | 540° C. + fraction |
|---|---|---|---|
| | (% weight fraction boiling below listed boiling point) (% weight) | | |
| 590° C. | 35.9 | | 16.6 |
| 700° C. | 51.6 | | 43.6 |

The 540° C.+fraction of Table 1 was subjected to a hydrocracking step wherein the feed was contacted with a 0.8 wt % platinum on amorphous silica-alumina carrier. The conditions in the hydrocracking step were: a fresh feed Weight Hourly Space Velocity (WHSV) of 0.9 kg/l.h, no recycle, and hydrogen gas rate=1100 Nl/kg feed, total pressure=32 bar. The reactor temperature was varied as listed in Table 2. The hydrocracker effluent was analysed and the yields for the different boiling fractions are listed in Table 2.

TABLE 2

| Example | 1-a | 1-b | 1-c | 1-d |
|---|---|---|---|---|
| Reactor Temperature, ° C. | 349 | 344 | 353 | 358 |
| Fraction boiling below 370° C. | 69.8 | 47.1 | 82.2 | 95.1 |
| Fraction boiling between 370 and 540° C. | 17.8 | 19.4 | 11.0 | 3.6 |
| Pour point of 350° C. plus fraction (° C.) | +51 | N.A. | +57 | N.A. |

N.A. = Not Analyzed

Thus relative to the feed to the distillation step 25 wt % of a fraction (i) boiling between 350 and 540° C. comprising substantially of n-paraffins is obtained in the distillation step and 14 wt % of a waxy raffinate fraction (ii) boiling between 370 and 540° C. is obtained in the hydrocracking step. These two fractions (i) and (ii) may be combined and a base oil may be prepared from this combined fraction by dewaxing.

To calculate the potential base oil yield on these fractions (i) and (ii) we have used our conversion models which provide the following conservative estimations. These estimations are to be used only in the context of the present application for illustration of the improved base oil yield of the process of the present invention compared to a prior art process.

Base oil yield as the fraction boiling between 400 and 540° C. of the dewaxed oil, having a kinematic viscosity at 100° C. of 5 cSt and a pour point of −20° C. starting from a n-paraffinic feed (i) is 45 wt %. This yield is achievable when the base oils are obtained by a combined hydroisomerisation step and a catalytic dewaxing step using a platinum ZSM-23 catalyst as described in EP-A-776959 for a different feed.

Thus from fraction (i) 11 wt % on feed of base oil may be obtained.

Base oil yield as the fraction boiling between 400 and 540° C. of the dewaxed oil, having a kinematic viscosity at 100° C. of 5 cSt and a pour point of −20° C. starting from an waxy Raffinate feed (ii) is 70 wt %. This yield is achievable when the base oils are obtained by subjecting the fraction (ii) to a catalytic dewaxing process using a silica bound platinum ZSM-12 type of catalyst as described in U.S. Pat. No. 6,576,120.

Thus from fraction (ii), as obtained in Example 1-b, 10 wt % on feed of base oil may be obtained. The total base oil yield on feed is thus 21 wt %.

Comparative Experiment A

Example 1 was repeated except that the Fischer-Tropsch derived product (feed) was directly submitted to the hydrocracker step. No prior distillation was performed. The yield to the 370-540° C. fraction on feed was 24 wt %. Because this fraction is also partly hydroisomerised the same estimated base oil yield as for fraction (ii) of Example 1 may be applied for this fraction. The base oil yield will then be 17 wt % on feed.

As can be seen by comparing Example 1 and comparative experiment A is that the base oil yield on Fischer-Tropsch derived product (feed) is significantly higher for the process according to the present invention (=21 wt %) as compared to a situation wherein the prior art process line-up is used (=17 wt %).

We claim:

1. A process to prepare base oils from a Fischer-Tropsch synthesis product, the processing comprising
   (a) separating the Fischer-Tropsch synthesis product into a fraction (i) boiling in the middle distillate range and below, a heavy ends fraction (iii) and an intermediate base oil precursor fraction (ii) boiling between fraction (i) and fraction (iii);
   (b) subjecting the base oil precursor fraction (ii) to a first catalytic hydroisomerization and catalytic dewaxing process to yield one or more base oil grades;
   (c) subjecting the heavy ends fraction (iii) to a thermal cracking process to yield a fraction (iv) boiling below the heavy ends fraction (iii); and,
   (d) subjecting a high boiling fraction (v) of fraction (iv) to the first catalytic hydroisomerization and catalytic dewaxing process or a second catalytic hydroisomerization and catalytic dewaxing process to yield one or more base oil grades.

2. The process of according to claim 1, wherein the heavy ends fraction (iii) has an initial boiling point of between 500° C. and 600° C.

3. The process of claim 1, wherein step (b) is performed in the presence of a catalyst comprising a noble metal hydrogenation component and a molecular sieve selected from the group consisting of zeolite beta, ZSM-23, ZSM-22, ZSM-35 or ZSM-12.

4. The process of claim 1, wherein step (d) is performed in the presence of a catalyst comprising a noble metal hydrogenation component and a molecular sieve selected from the group of zeolite beta, ZSM-23, ZSM-22, ZSM-35 or ZSM-12.

5. The process of claim 1, wherein the feed to step (a), step (b) and/or step (c) is first hydrogenated.

6. The process of claim 1, wherein the fraction boiling below 370° C. as obtained in step (c) is subjected to an oligomerization step (f).

7. The process of claim 6, wherein a base oil fraction is prepared in step (f) and which base oil fraction is mixed with the base oil products obtained in step (b) and/or (d).

8. The process of claim 6, wherein a base oil fraction is prepared in step (f) and which base oil fraction is dewaxed in step (b).

9. The process of claim 1, wherein the effluent of step (c) is provided to step (a), such that in effect steps (b) and (d) take place simultaneously.

10. The process of claim 2, wherein step (b) is performed in the presence of a catalyst comprising a noble metal hydrogenation component and a molecular sieve selected from the group consisting of zeolite beta, ZSM-23, ZSM-22, ZSM-35 or ZSM-12.

11. The process of claim 2, wherein step (d) is performed in the presence of a catalyst comprising a noble metal hydrogenation component and a molecular sieve selected from the group of zeolite beta, ZSM-23, ZSM-22, ZSM-35 or ZSM-12.

12. The process of claim 2, wherein the feed to step (a), step (b) and/or step (c) is first hydrogenated.

* * * * *